(12) United States Patent  
Leach et al.

(10) Patent No.: US 7,966,796 B2
(45) Date of Patent: Jun. 28, 2011

(54) APPARATUS AND METHOD FOR HARVESTING AND PROCESSING CELERY

(75) Inventors: Thomas E. Leach, Berlin, WI (US); Peter DeGroot, Salinas, CA (US)

(73) Assignee: Leach Farms, Inc., Berlin, WI (US)

( * ) Notice: Subject to any disclaimer, the term of this patent is extended or adjusted under 35 U.S.C. 154(b) by 225 days.

(21) Appl. No.: 11/985,135

(22) Filed: Nov. 14, 2007

(65) Prior Publication Data

US 2009/0133373 A1  May 28, 2009

(51) Int. Cl.
  *A01D 45/00* (2006.01)
(52) U.S. Cl. .......................... 56/327.1; 171/22
(58) Field of Classification Search ................ 56/327.1; 460/123–148; 171/21, 22
  See application file for complete search history.

(56) References Cited

U.S. PATENT DOCUMENTS

| 968,432 A | 8/1910 | Stoker |
| 2,243,650 A | 5/1941 | Poll |
| 2,468,276 A | 4/1949 | Sorenson |
| 2,473,587 A | 6/1949 | Huston |
| 2,479,510 A * | 8/1949 | Pollard et al. .................. 56/500 |
| 2,529,515 A * | 11/1950 | Silva ................................ 171/22 |
| 2,585,416 A | 2/1952 | Weid et al. |
| 2,647,525 A | 8/1953 | Duda et al. |
| 3,126,113 A | 3/1964 | Kaper |
| 3,442,071 A | 5/1969 | Duda, Jr. |
| 3,503,196 A | 3/1970 | Jarrett |
| 3,543,493 A | 12/1970 | Duda, Jr. |
| 3,548,575 A | 12/1970 | Lane |
| 3,548,950 A | 12/1970 | Phelan et al. |
| 3,586,108 A | 6/1971 | Wedgeworth et al. |
| 3,690,049 A | 9/1972 | Roberson |
| RE27,674 E | 6/1973 | Grether et al. |
| 4,094,238 A | 6/1978 | Striplin |
| 4,395,176 A | 7/1983 | Green |
| 4,395,194 A | 7/1983 | Green |
| 5,431,231 A * | 7/1995 | Abe et al. ........................ 171/26 |
| 6,003,293 A * | 12/1999 | Boese ........................... 56/327.1 |
| 7,007,449 B2 | 3/2006 | Kido et al. |
| 2005/0055993 A1 | 3/2005 | Maconachy et al. |
| 2008/0216459 A1* | 9/2008 | Spitzley ........................ 56/12.7 |

* cited by examiner

*Primary Examiner* — Alicia M Torres
(74) *Attorney, Agent, or Firm* — Ryan Kromholz & Manion, S.C.

(57) ABSTRACT

An improved machine and method for harvesting and processing an upstanding crop, such as celery, in situ, the machine comprising a self driven vehicle supporting a plurality of harvesting and processing units.

13 Claims, 10 Drawing Sheets

APPARATUS AND METHOD FOR HARVESTING AND PROCESSING CELERY

BACKGROUND OF THE INVENTION

This invention relates generally to crop harvesting and particularly to a device and method for mechanically harvesting and processing celery or other similar, upstanding crop in the field. The invention is directed to a driven, self-contained harvesting and processing device capable of removing the plant from the soil, trimming the greens from the stalk, slicing the stalk pieces into pieces of predetermined dimensions, removing debris from the sliced pieces and grading the sliced pieces.

Historically, many food crops, such as celery, have been harvested on large truck farms, with much of the harvesting work conducted by manual laborers. In the growing industry, specialized devices to aid in the harvest have been developed, however these devices have mainly aided in post harvest handling, with manual labor still being required to cut the plant from its root, trim the leaves from the top of the plant, or place the harvested plant on a conveyor for further processing, such as slicing, grading, removal of extraneous debris, and washing. Consequently, prior known devices have suffered from economic or functional deficiencies, as they have provided only partial mechanization of the harvesting and processing procedure.

Further, none of the prior devices has been known to combine the functions of the present device while operating in the field.

SUMMARY OF THE INVENTION

This invention relates generally to crop harvesting equipment and more specifically to a self-propelled celery harvester having unique multi-tasking properties.

The present invention provides a novel harvesting machine that includes means to do multiple tasks while still in the field, including some of those presently done by hand, and/or those done away from the harvest field, thereby reducing overall harvesting and processing cost. The apparatus includes one or more rotating top knives for removing the top leaves from the celery plant while the celery is still in the ground, one or more fixed lower knives for severing the plant from the root portion, a first conveyor system for moving the severed plants from the field level to an elevated slicing area, an elevated trans-slicing area having a plurality of knives (such as those manufactured by Urschel Laboratories, Inc. of Valparaiso, Ind.), means to remove unwanted debris, such as a vacuum system, a second conveyer system for moving and grading the sliced celery from the elevated trans-slicing area toward a third conveyor system, and a third conveyor system for moving the sliced, graded celery toward a load out container.

It is an object of the present invention to provide a new and improved celery harvesting and processing machine comprising a self driven vehicle supporting a plurality of harvesting and processing units.

Another object of the present invention is to provide a celery or other vegetable harvester including a plurality of cooperating harvesting and processing units supported and transported by an underlying operator-driven tractor unit; wherein the harvester is driven along a first selected row of upstanding plants for harvest, wherein the harvester further includes, among other processing units, a forwardly extending elongated boom supporting initial harvesting blades at its distal end and being pivotally and slidably mounted at its elevated proximal end for unique movement in both a vertical plane and a horizontal plane, and wherein the operator cab unit is pivotally mounted for vertical and horizontal movement relative the aforementioned boom supporting the initial harvesting blades. The present primary object provides a convenient means of utilizing the harvester from row to row within a minimal geographic harvesting area by providing means to move the processing units to either side of the machine.

It is still another object of the invention to provide a celery harvester which will remove the tops from the stalks, sever the stalks from the roots, remove and convey the stalks from the ground to a slicing station, convey the sliced stalks from the slicing station to a grader, remove unwanted debris, and transport the graded celery to adjacent, external transporting means.

An improved harvesting machine according to the present invention, includes: (1) cutting means for initially cutting off the leaves at the top portion of the plant while the plant is still planted in the soil; (2) cutting means for severing the plant at its base to thereby detach it from its root portion; (3) first conveying means to move the harvested plant to a slicing area; (4) slicing means to cut the stalks into various desired configurations, such as sticks of predetermined length; (5) means to remove leaf pieces and other debris from the pieces, such as vacuum means; (6) grading means to grade the pieces according to size; (7) second conveying means to move the graded pieces to storage and transportation containers. The improved machine preferably further includes (8) elevator means arranged to alternatively raise and lower the cutting station and first conveyor relative to the cab. The ability to control the vertical position of the cutting station and the first conveyor may be further coupled with (9) horizontally moveable means arranged to alternatively move the cutting station and the first conveyor horizontally. This combination of movement means thereby allows alternative sidewise movement and alignment of the various cooperating components. Alternative alignment permits facile operation on either side of the machine. This feature enables the user to facilely harvest adjacent crop rows upon reaching the end of a row, turning the machine to go down an adjacent, parallel row and to then shift the alignment of the machine to an alternative harvester side.

Thus, an object of the invention is to provide a combination celery harvester and processor including: cutting means for initially cutting off the leaves at the top portion of the plant while the plant is still planted in the soil; cutting means for severing the plant at its base to thereby detach it from its root portion; conveying means to move the harvested plant to a cutting area; slicing means to cut the celery stalks into varying desired configurations, such as sticks of predetermined length; means to remove leaf pieces and other debris from the pieces; grading means to grade the pieces according to size; and conveying means to move the graded pieces to storage and transportation containers.

DESCRIPTION OF THE PREFERRED EMBODIMENT

Figure 1:
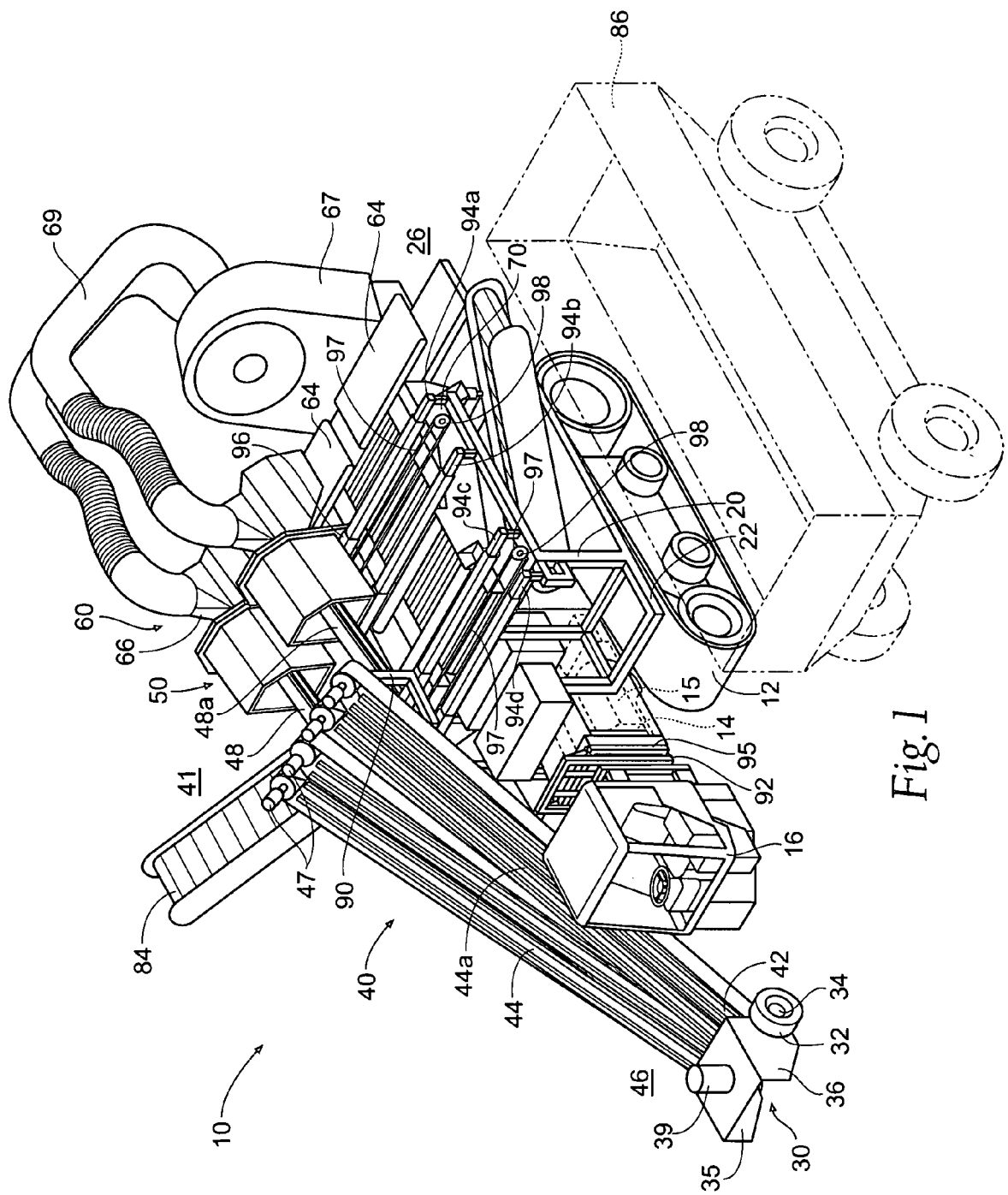
FIG. 1 is a perspective view of a harvester according to the present invention and showing a transport container in phantom.
Figure 2:
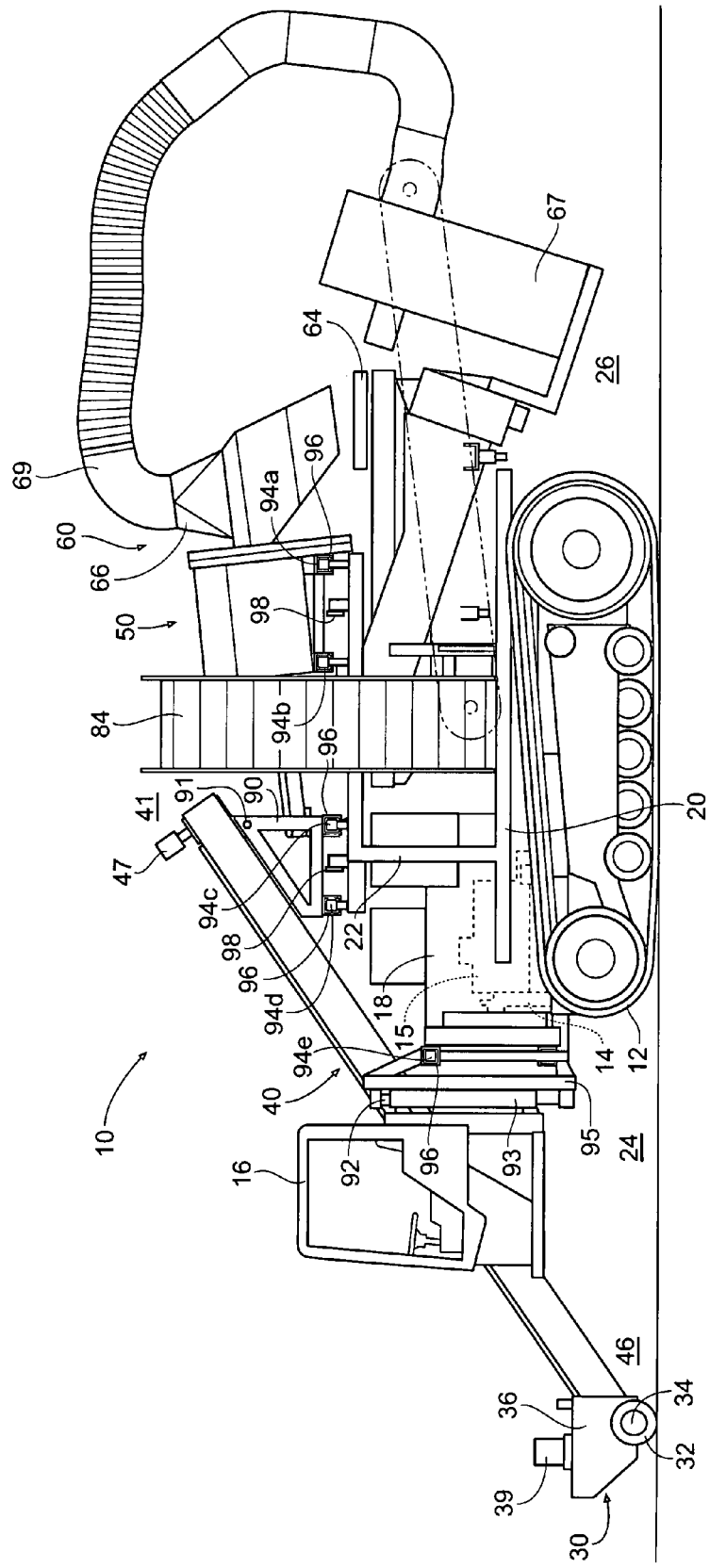
FIG. 2 is a side elevation view of the device shown in FIG. 1 and showing the operator cab and initial cutting station in relative operating position.

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the Claims.

As illustrated in the Figures, a preferred embodiment of the harvester 10 is shown in connection with the harvesting of celery, but it is to be understood that the harvester 10 may be used to harvest other similar types of upstanding vegetables, such as cabbage and the like. As it may be observed particularly in FIGS. 1-4, the harvester 10 may be provided with wheels, tracks 12, or other earth-engaging members and driven by a prime mover, such as the diesel engine 14 shown. The harvester 10 further includes a forward end 24 and a trailing end 26, with an operator's station or cab 16 located at the forward end 24 to provide maximum visibility by the operator (not shown). In the Figures, the harvester 10 is illustrated as generally including a track-laying, power-driven tractor 18 having tracks 12 for movement of the harvester 10 along crop rows 200 (seen in FIG. 11). A supporting structure 20 is mounted on the tracks 12, which comprises a plurality of frame members 22.

As may be further seen in the Figures, the forward end 24 of the harvester 10 is provided with an initial cutting station 30. Illustrated particularly in FIGS. 7 and 8, the initial cutting station 30 may be provided with ground-engaging wheels 32 mounted on axle 34. A housing, or protective shroud 36, is further provided for the purpose of surrounding initial cutting elements 37, 38 (see particularly FIG. 8). As seen, the shroud 36 includes at least one open end 35 which allows entry of the rooted and upstanding plant 100 to be harvested as the harvester moves along the crop rows 200. As may be observed in the Figures, cutting element 38 is preferably in the form of a horizontally rotatable blade 38, which is rotated by auxiliary drive 39. In operation, as the harvester 10 advances, blade 38 is arranged to remove the leafy portion of the plant 100 (seen as celery in these views). The initial cutting station 30 preferably further includes means for severing the plant 100 from the roots (not shown). For this purpose, and as shown particularly in FIG. 8, the initial cutting station 30 may include at least one root cutting blade, such as the butt knife 37, shown for severing the plants 100 from the ground.

As seen in FIG. 1, the harvester 10 further includes a forwardly extending elongated boom 40 defined by one or more oppositely disposed elevating conveyor supporting side frames 42. The boom 40 supports the aforementioned initial cutting station 30 at its distal end 46 and is pivotally and slidably mounted at its elevated proximal end 41 for unique movement in both a vertical plane and a horizontal plane. Elevating conveyor side frames 42 support a plurality of resiliently faced, endless elevator belts 44, 44a which are each supported at the distal and proximal ends 46, 41, respectively, of the boom 40. As illustrated, the harvester 10 may include a pair of belts 44, 44a for each row 200 (see FIG. 11) of plants 100 (see FIG. 7). As the harvester 10 advances, each pair of belts 44, 44a grasps, in sequence, the topped plants 100 as the root cutting butt knife 37 (see FIG. 8), mounted below the belts 44, 44a severs the plant 100 from the ground. Conveyor frames 42, along with the cooperating belts 44, 44a, are located directly behind the cutting station 30 and serve to raise the severed plants 100 from ground level to elevated trans-slicing station 50. Individual spindle members 47 serve to rotatably support and drive the belts 44, 44a. Intermediate drive members serving the spindles 47 are not specifically shown, but derive power from the hydraulic pump 15 via conventional power coupling means. As illustrated particularly in FIGS. 1 and 9, as the belts 44, 44a, raise the severed plants 100 toward elevated trans-slicing station 50, the plants 100 are deposited on intermediate belt pairs 48, 48a. As may be observed particularly in FIG. 9, intermediate belt pairs 48, 48a serve to move the severed plants 100 into the slicing station 50 and may include angularly disposed belt elements for optimal control and positioning of the plants 100. It is to be noted that while not specifically shown, motive power for the cooperating elements is derived from the hydraulic pump 15 via conventional power coupling means. As is shown in phantom, the hydraulic pump 15 is powered by diesel or other internal combustion engine 14 (see particularly FIG. 9). Further, it is to be understood that while hydraulic pump 15 is illustrated by way of example, other conventional power sources may be utilized.

Figure 9:
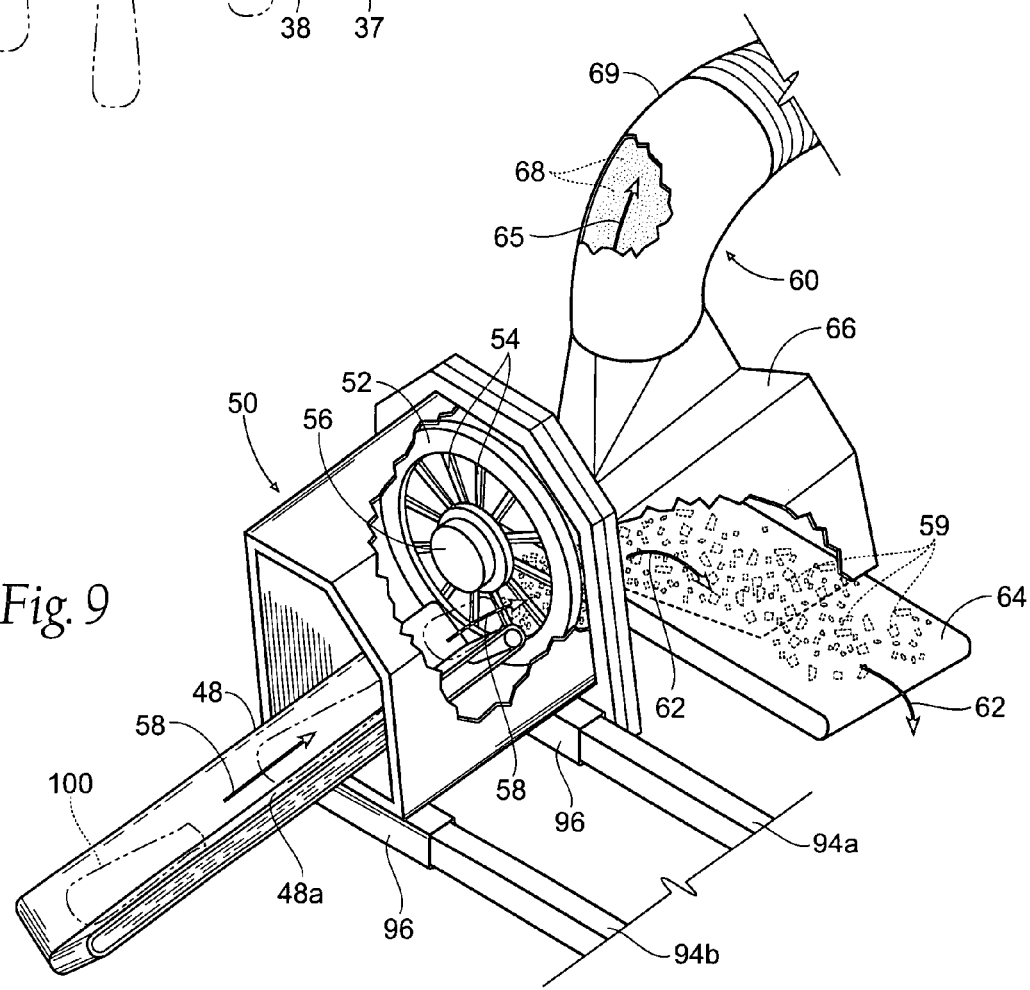
FIG. 9 is a fragmentary, partially cut away, perspective view of the trans-slicing and debris removal stations of the device.

As seen particularly in FIGS. 1 and 9, an elevated trans-slicing station 50 includes a cutting wheel 52 supporting a plurality of radially extending blades 54. As may be observed, the blades 54 may be radially arranged around an axle 56, such that as the plants 100 are moved toward the blades 54 in the direction of the arrow 58, they are sliced into individual pieces 59 having a predetermined size. As mentioned previously, cutting wheel 52, such as that shown, may be manufactured by Urschel Laboratories, Inc. of Valparaiso, Ind., for example. The cutting wheel 52 may be interchanged and positioned for maximum versatility according to the cut desired, such as, slicing, julienne, or the like, by way of example. The trans-slicing station 50 is conveniently adaptable for uniformly slicing the celery stalks or other elongated, harvested vegetable, with precision and at high capacities.

Figure 7:
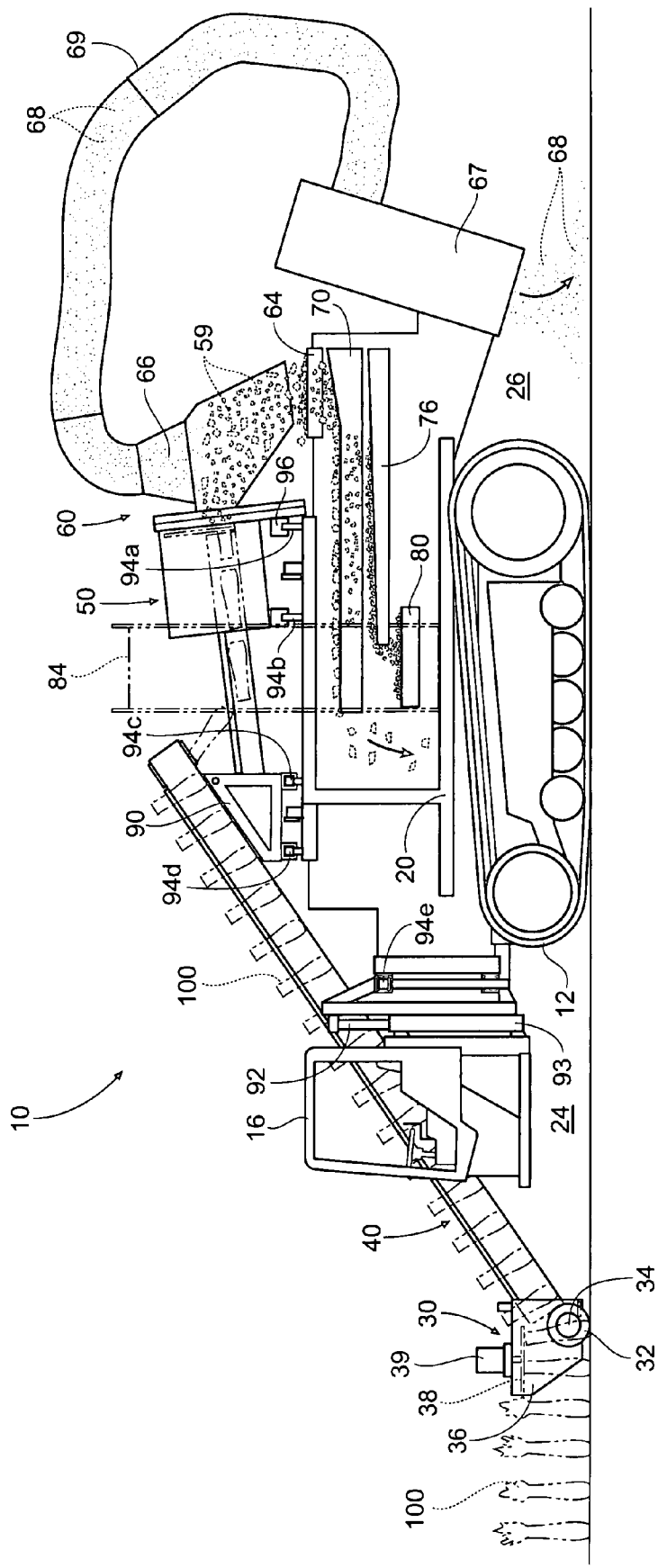
FIG. 7 is a side plan view of an embodiment of the harvester with plants being processed shown in phantom.
Figure 8:
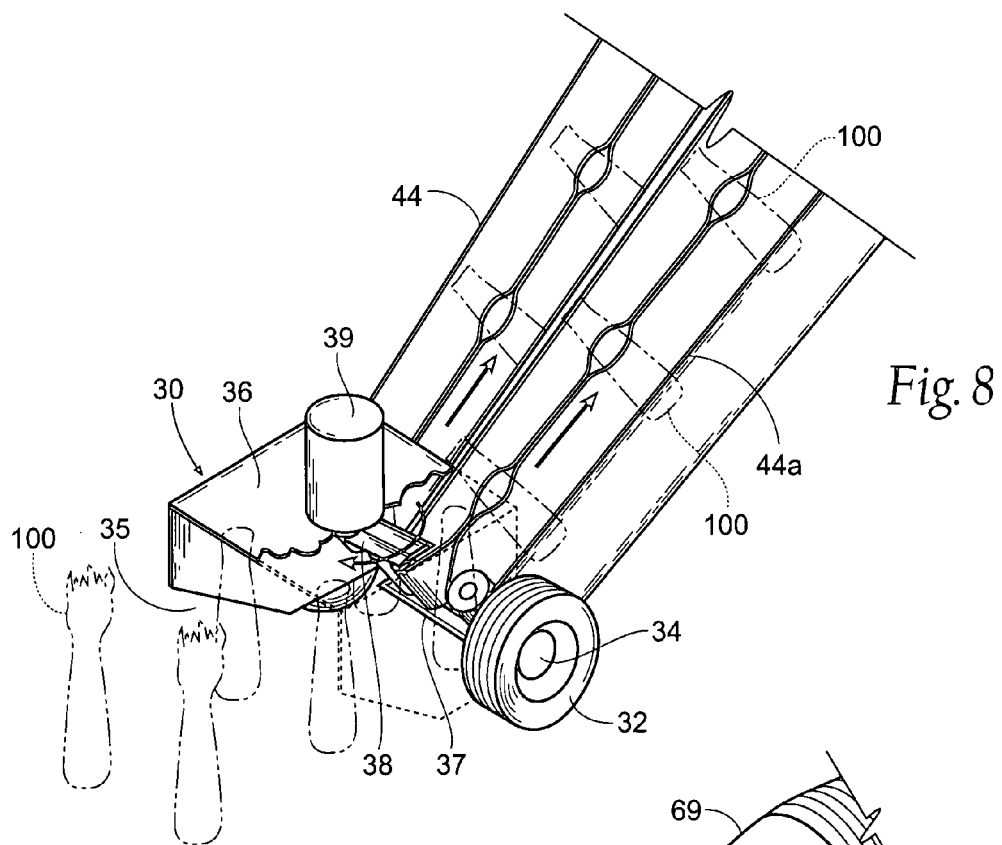
FIG. 8 is a fragmentary, partially cut away, perspective view of the initial cutting station of the device.
Figure 10:
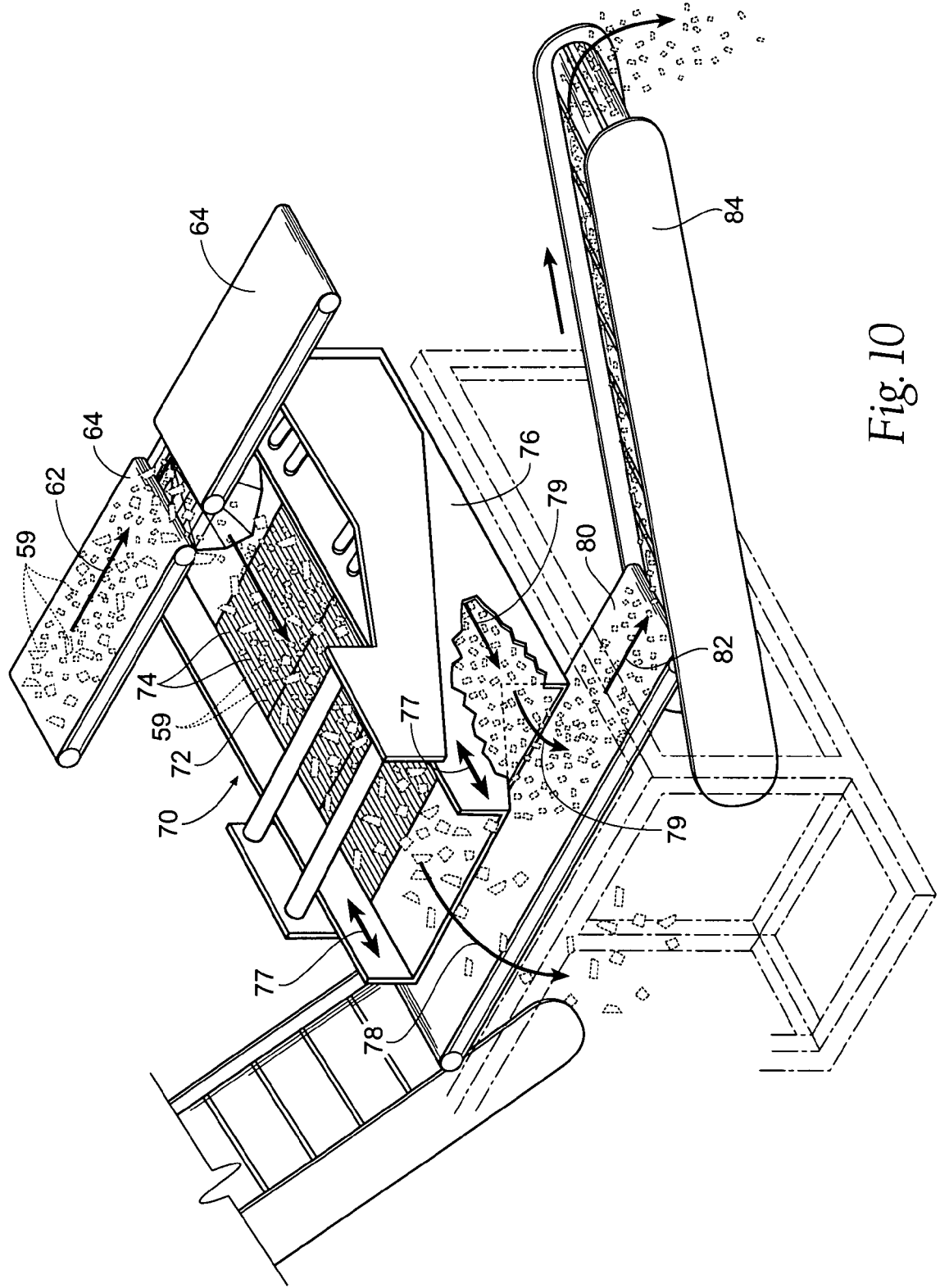
FIG. 10 is a fragmentary view illustrating various conveyors and the grading station with their relative movement indicated by arrows.

Turning specifically to FIGS. 7 and 9, it may be observed that the harvester 10 may further include a debris-removal station 60. As seen in these views, the sliced pieces 59 exit the trans-slicing station 50 to fall beneath a suction hood 66 of the debris-removal station 60 and onto auxiliary conveyor 64. Auxiliary conveyor 64 carries the pieces 59 in the direction of arrow 62. As seen particularly in FIG. 1, the debris-removal station 60 of the present embodiment may include a fan 67 or other device to create a partial vacuum under the hood 66 to draw debris 68, such as dirt and other particulate matter, away from the pieces 59 and through duct 69. As illustrated particularly in FIG. 9, the debris 68 moves through the hood 66 and duct 69 in the direction of arrow 65 to be deposited at the trailing end 26 of the harvester 10 (seen in FIG. 7). With reference to FIGS. 9 and 10 in particular, it may be seen that auxiliary conveyor belt 64 moves the pieces 59, now separated from the debris 68, in the direction of arrow 62 and toward a grading station 70. There the pieces 59 are graded according to desired final product size.

Illustrated particularly in the view of FIG. 10, the grading station 70 may include a grate 72 having a plurality of cross bars 74 which may be spaced to define transversely spaced interstices configured to permit passage of cross-sliced or julienne cut product, depending on the grading operation desired. For example, a wider spacing allows larger sized pieces 59 to fall through, while a smaller spacing allows only the smallest pieces 59 to fall through. With further reference to FIG. 10, pieces 59 which are permitted to fall through the grate 72 land on tray 76. As illustrated, the grading station 70 may further include means for horizontal movement in the direction indicated by arrows 77 to thereby encourage the pieces 59 to fall through the grate 72, as described. Any pieces 59 which do not fall through to tray 76, move in the direction of arrow 78 and ultimately fall to the ground (not shown in this view) as debris. Pieces 59 which fall through the cross bars 74 are deposited on tray 76 and are encouraged in the direction of arrow 79 toward a perpendicularly disposed conveyor 80. Conveyor 80 moves the graded pieces 59 in the direction of arrow 82 to a laterally extending, off-loading conveyor 84. The off-loading conveyor 84 serves to move the graded pieces 59 toward a transport container or vehicle 86 (seen in phantom in FIG. 1). The transport vehicle 86 travels across the field alongside the harvester 10 in a conventional manner. It may be observed in the view of FIG. 2 that the off-loading conveyor 84 may be moveable between a laterally-extending functional position, and a stowed, retracted position, shown in phantom.

A further feature of an embodiment of the present harvester 10 is exemplified in the views of FIGS. 3-6, and 11. As shown, the harvester 10 may be provided with means to laterally shift the cooperating components such as the cab assembly 16, initial cutting station 30, boom 40, slicing station 50, and debris-removal station 60 to alternative sides of the harvester 10. As illustrated particularly in the views of FIGS. 5 and 6, components 30, 40, 50, and 60 may be shifted in the direction of arrow 88 to thereby align the components 30, 40, 50, and 60 along an alternative side. The harvester 10 then operates in the manner previously described while utilizing an alternative laterally extending, offloading conveyor 84. This feature allows the user of the harvester 10 to easily harvest adjacent crop rows 200 (see particularly FIG. 11). Typically, when a harvester reaches the end of a row, the driver must turn the harvester to proceed down a parallel, but not adjacent crop row. This requires a subsequent trip down the adjacent row. The ability of the present harvester 10 to shift the components 30, 40, 50, and 60, to thereby align them on alternative sides of the harvester 10, permits the harvester 10 to harvest adjacent crop rows 200 without the requirement of revisiting alternate rows later in the harvesting process.

Figure 3:
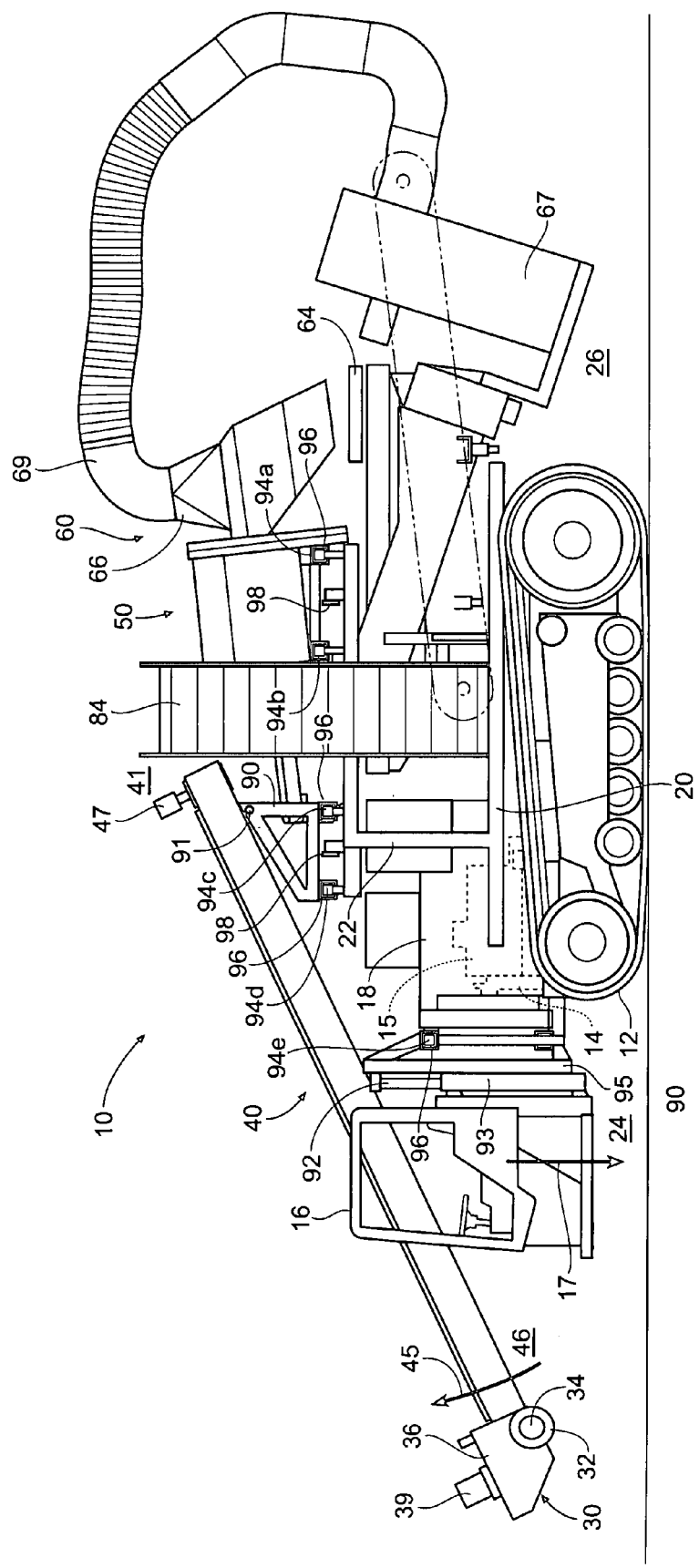
FIG. 3 is a view similar to that of FIG. 2, but showing the operator cab and the initial cutting station in relative vertical movement.
Figure 4:
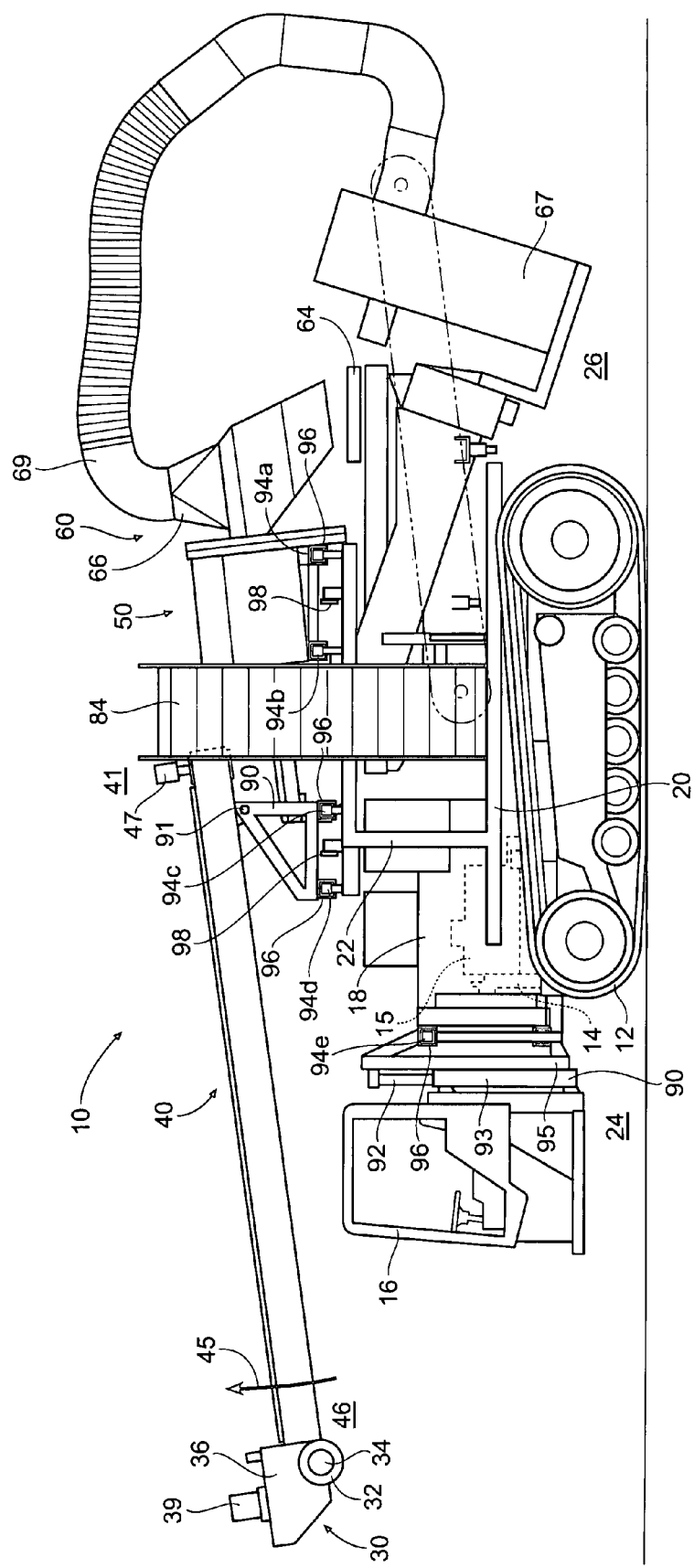
FIG. 4 is a view similar to that of FIGS. 2 and 3, but showing the operator cab and the initial cutting station in further relative vertical movement, with the initial cutting station and boom raised for horizontal movement.
Figure 5:
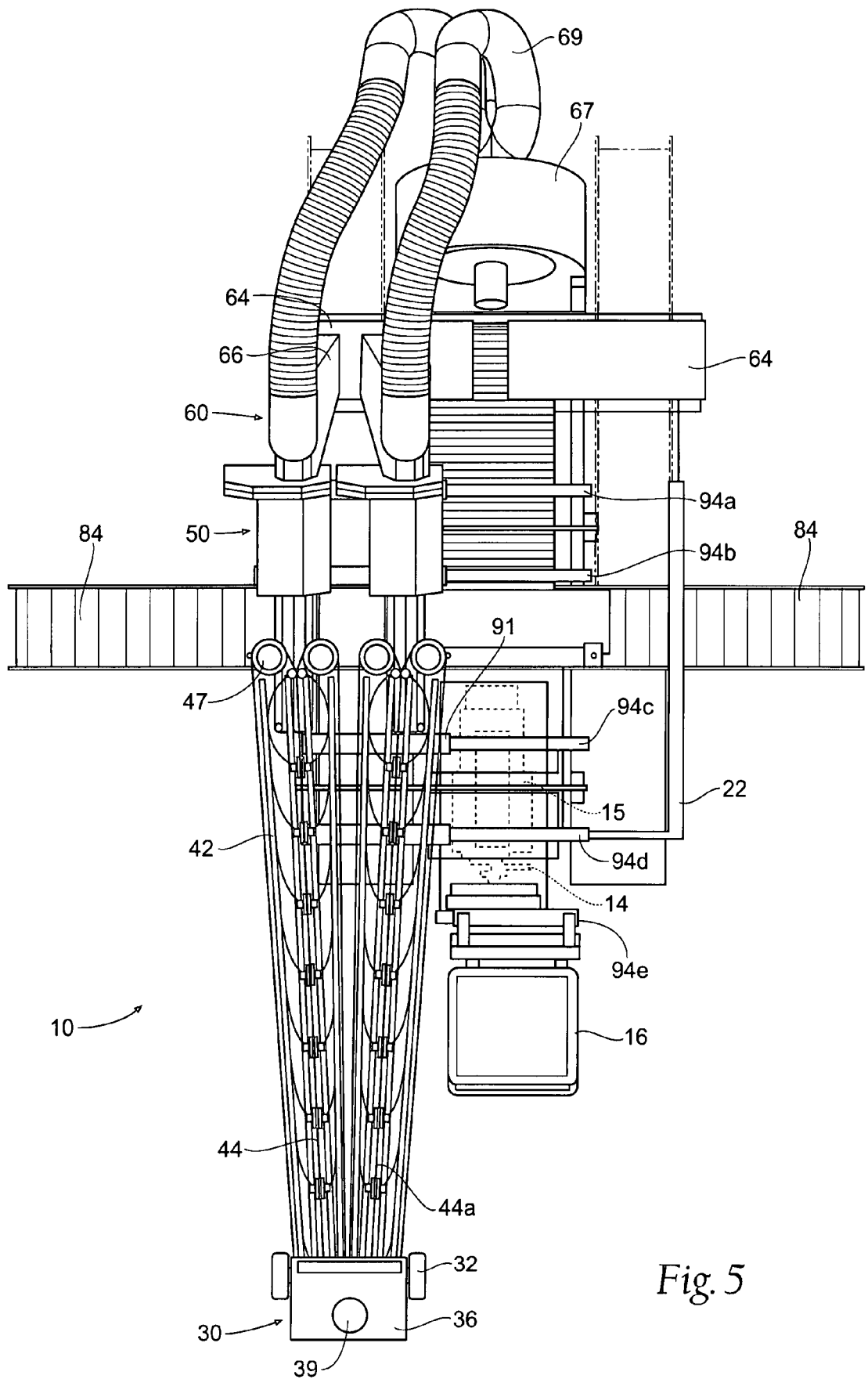
FIG. 5 is a top plan view of the harvester shown in FIG. 1 and illustrating the initial cutting station, boom and trans-slicing station in operational condition on the right side of the forward motion of the operator cab, with the stowed position of an off-loading conveyor being shown, at upper right, in phantom.
Figure 6:
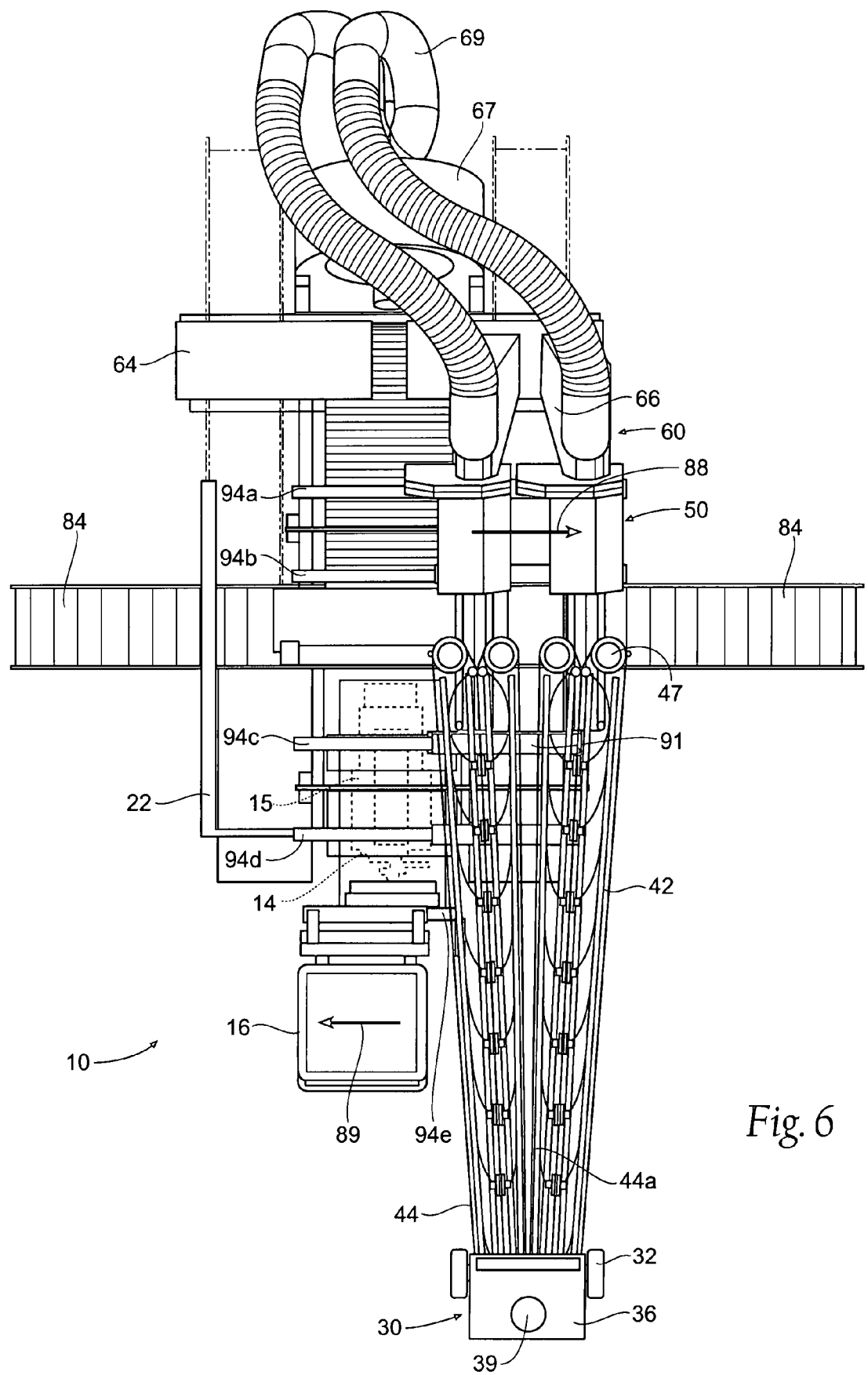
FIG. 6 is a top plan view similar to that of FIG. 5, but showing the initial cutting station, boom, and trans-slicing station in operational condition on the left side of the forward motion of the operator cab.

As may be seen in FIGS. 3 and 4, shifting of components 30, 40, 50, and 60 is accomplished by first lowering the operator cab assembly 16 in the direction of arrow 17 and raising the cutting station 30 and boom 40 in the direction of arrow 45. As previously mentioned, the boom 40 may be pivotally mounted at its elevated proximal end 41 for unique movement in a vertical plane, with the operator cab 16 being mounted for vertical movement relative to the boom 40. As seen in FIGS. 1-4, the boom 40 is pivotally supported at 91 on framework 90. As is further seen in FIG. 3, the boom 40 is rotated upward in the direction of arrow 45 to provide clearance between it and the cab assembly 16. Other pivotable means may also be utilized, such as a rotatably movable tubular shaft positioned circumjacent to a stationary supporting shaft (not shown). Likewise, the cab assembly 16 may be adapted for vertical movement. As may be observed particularly in the views of FIGS. 1-4, the cab assembly 16 may be attached to the tractor 18 by way of vertical support member 92. Vertical movement of the cab assembly 16 may be effected by use of the vertical support member 92 and tubular shaft 93 positioned circumjacent the support member 92, as shown, or other conventional means. Motive power for vertical movement of the cab assembly 16 may be derived from the hydraulic pump 15 shown, or other conventional means. The lowering of the cab assembly 16 and raising of the boom 40 provides clearance between the cab 16 and boom 40 to thereby allow the boom 40, elevated trans-slicing station 50, and debris removal station 60 to move horizontally, from a first side of the harvester 10 to an alternative side. As seen in the view of FIG. 6, once the boom 40 and cab assembly 16 have been moved vertically relative to one another as discussed to provide clearance, the boom 40, trans-slicing station 50 and debris removal station 60 may be horizontally shifted in the direction of arrow 88 to an adjacent side. Concurrently, the cab assembly 16 may be horizontally shifted in the direction of arrow 89 to an opposed, adjacent side. During horizontal movement of cooperating parts the trans-slicing station 50 rides on rails 94A, 94B along with the proximal end 41 of the boom 40 which rides on rails 94C, 94D. As may be observed particularly in FIG. 1, the trans-slicing station 50 further includes at least one extending gripping member 96 which engages a corresponding stationary rail 94A, 94B for relative longitudinal movement of the trans-slicing station 50. Likewise, support frame 90 may further include at least one extending gripping member 96 which is adapted to slidingly engage a corresponding stationary rail 94C, 94D for relative longitudinal movement of the boom 40. In a similar manner, the cab assembly 16 rides on rails 94e. As illustrated, the cab assembly 16 is supported on the forward end 24 of the harvester 10 by way of a frame 95 which preferably further includes means to slidingly engage rail 94e. As illustrated, the frame 95 may include least one extending gripping member 96 which slidingly engages rail 94e to thereby facilitate horizontal movement of the frame 95 and attached cab assembly 16. Horizontal movement of the cooperating parts may be effected by way of the chain 97 and sprocket 98 arrangement shown, or by other conventional means. Power for the horizontal movement may be derived from the aforementioned hydraulic pump 15. After the boom 40, trans-slicing station 50 and debris removal station 60 have been horizontally shifted, as discussed, the boom 40 and cab 16 are then returned to their usual operating positions. As seen, the harvesting and processing procedures remain the same regardless of which harvester operating side is utilized, while using an alternative, corresponding conveyor 64 and off-loading conveyor 84. Although the trans-slicing station, 50 is illustrated as being mounted on rails 94A, 94B to facilitate sliding of the components, it is to be understood that other mounting mechanisms that enable similar shifting of components may be envisioned.

Figure 11:
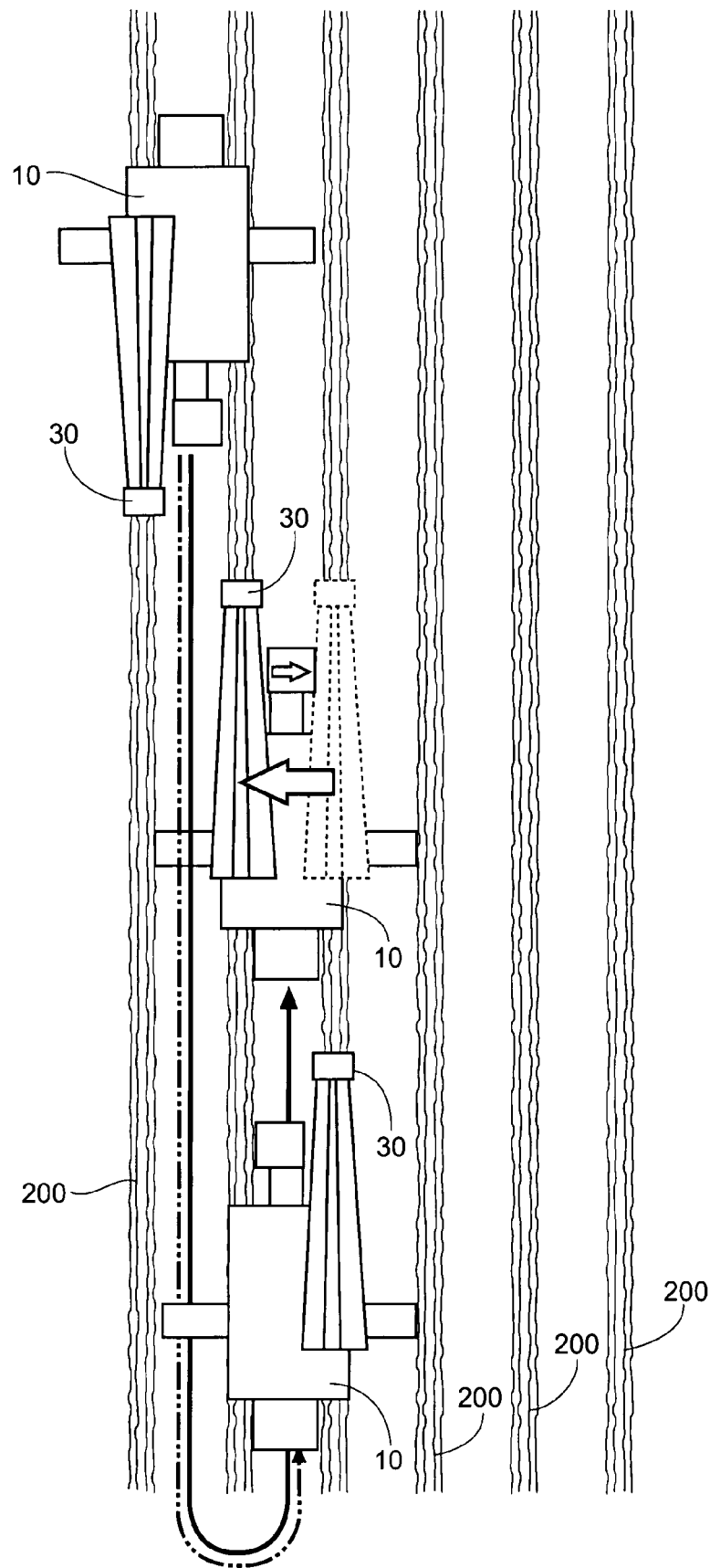
FIG. 11 is a top plan view illustrating a harvester according to the present invention moving along a crop row with path shown in dashed line, and relative component alignment shift shown with an arrow.

FIG. 11 depicts a harvester 10 of the present invention as it moves along a crop row 200. The path of the harvester 10, shown in solid line, illustrates the harvester turning at an end of a row, with a harvester 10 in phantom showing an unshifted apparatus. FIG. 11 illustrates the manner in which a harvester is unable to access the nearest adjacent row 200 and must skip a row and harvest an alternating row 200 unless the harvester is able to shift components as herein described. As shown, and as described hereinabove, the present harvester 10 is enabled to shift operating components 30, 40, 50, and 60 to thereby gain access to the immediately adjacent crop row 200. This capability saves harvest time and provides a cost savings.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the Claims.

We claim:

1. A harvesting and processing apparatus for traveling along a row of plants upstanding from the soil, said apparatus including:
   a. a mobile frame suitable for moving along at least one row of upstanding plants;
   b. a first cutting means for initially cutting off leaves at a top portion of a plant while the plant remains planted in the soil;
   c. a second cutting means for severing the plant at its base, to thereby detach the plant from its implanted root portion;
   d. conveying means to move the harvested plant to a slicing area;
   e. slicing means located in the slicing area to slice the harvested plant into sliced pieces having a configuration of predetermined size, said slicing means comprising a transverse cutting wheel supporting a plurality of radially extending blades members;
   f. grading means to grade the sliced pieces according to size, said grading means including a grate having a plurality of cross bars spaced to define transversely spaced interstices;
   g. conveying means to move the graded pieces to storage and transportation containers; and
   h. means for alternative lateral positioning of said first and second cutting means.

2. The apparatus of claim 1 further including an auxiliary conveyor for moving the sliced pieces to said grading means.

3. The apparatus of claim 1 further including means to remove debris from the sliced pieces.

4. The apparatus of claim 3 wherein said means to remove debris includes a mechanism for providing a partial vacuum.

5. The apparatus of claim 1 wherein said means for severing said plant at its base comprises a butt knife.

6. The apparatus of claim 1 wherein said first cutting means comprises a rotatable blade.

7. The apparatus of claim 1 further including means for alternative lateral positioning of said slicing means.

8. A method for harvesting and processing celery including the steps of:
   a. providing a mobile structure supporting a mobile frame suitable for moving down at least one row of upstanding plants;
   b. moving said frame down a first row of upstanding plants;
   c. providing a distal portion of said frame with a first cutting means for initially cutting off leaves at a top portion of a plant while the plant remains planted in the soil;
   d. providing a distal portion of said frame with a second cutting means for severing the plant at its base to thereby detach it from its root portion;
   e. providing said frame with conveying means to move the harvested plant to a slicing area;
   f. conveying the harvested plant to a slicing area;
   g. providing slicing means in the slicing area to slice the harvested plant into individual pieces having a configuration of predetermined size, said slicing means comprising a transverse cutting wheel supporting a plurality of radially extending blade members;
   h. moving said individual pieces over a grate having a plurality of cross bars spaced to define transversely spaced interstices, said interstices configured to permit passage of selected individual graded pieces;
   i. providing conveying means to move the individual graded pieces to at least one off-loading container;
   j. moving the individual graded pieces to at least one off-loading container; and
   k. providing means for lateral shifting said mobile frame, said first cutting means, said second cutting means, and said conveying means to an alternative side of said structure.

9. The method of claim 8 further including the step of providing means to remove debris from said individual pieces.

10. The method of claim 8 further including the step of moving the individual pieces through a partial vacuum to remove debris from said individual pieces.

11. A celery harvesting and processing machine comprising:
   a. a self propelled vehicle;
   b. support means extending from said vehicle for supporting a plurality of harvesting components;
   c. at least one inclined conveyor means, said conveyor means comprised of at least a pair of cooperating belts grippingly engagable with harvested celery plants and arranged to individually transport said plants upwardly from soil level;
   d. leaf severing means for severing a predetermined upper leafy portion from each celery plant,
   e. root severing means for severing each celery plant from its roots; and
   f. slicing means for slicing each plant into pieces having a predetermined size and shape, said slicing means comprising a transverse cutting wheel supporting a plurality of radially extending blades members;
   g. at least one grate having a plurality of cross bars spaced to define transversely spaced interstices, said interstices configured to permit passage of selected, individual graded pieces; and
   h. means for alternative lateral positioning of said conveyor means, said leaf severing means, and said root severing means.

12. The machine of claim 11 further including debris removal means.

13. The machine of claim 12 wherein said debris removal means includes a mechanism for providing a partial vacuum.

* * * * *